(12) United States Patent
Chernyak et al.

(10) Patent No.: US 7,406,868 B2
(45) Date of Patent: Aug. 5, 2008

(54) COMPENSATING ACCELEROMETER WITH OPTICAL ANGLE SENSING

(75) Inventors: Mykola G. Chernyak, Kiev (UA); Gennadiy A. Skrypkovskyy, Kiev (UA)

(73) Assignee: Innalabs Technologies, Inc., Dulles, VA (US)

( * ) Notice: Subject to any disclaimer, the term of this patent is extended or adjusted under 35 U.S.C. 154(b) by 179 days.

(21) Appl. No.: 11/460,985

(22) Filed: Jul. 30, 2006

(65) Prior Publication Data

US 2007/0214885 A1    Sep. 20, 2007

Related U.S. Application Data

(60) Provisional application No. 60/783,448, filed on Mar. 20, 2006.

(51) Int. Cl.
*G01P 3/00* (2006.01)

(52) U.S. Cl. ............... 73/509; 73/514.26; 73/514.36

(58) Field of Classification Search ............ 73/509, 73/514.26, 514.36
See application file for complete search history.

(56) References Cited

U.S. PATENT DOCUMENTS

| | | | |
|---|---|---|---|
| 4,512,193 A * | 4/1985 | Fukano | 73/514.19 |
| 4,512,593 A | 4/1985 | Ehrhardt | |
| 4,649,748 A * | 3/1987 | Fukano et al. | 73/514.19 |
| 5,055,759 A * | 10/1991 | Miyahara | 318/651 |
| 5,488,865 A * | 2/1996 | Peters | 73/514.23 |
| 5,721,378 A * | 2/1998 | Furuichi et al. | 73/514.19 |
| 7,181,852 B2 * | 2/2007 | Bryan | 33/203.18 |
| 2004/0194327 A1 * | 10/2004 | Bryan | 33/203.18 |

FOREIGN PATENT DOCUMENTS

| | | |
|---|---|---|
| EP | 0707213 | 4/1996 |
| FR | 2562254 | 10/1985 |
| JP | 59 090173 | 5/1983 |

OTHER PUBLICATIONS

European Search report for Application No. 07250954.0-1236.

* cited by examiner

*Primary Examiner*—Hezron E. Williams
*Assistant Examiner*—Samir M. Shah
(74) *Attorney, Agent, or Firm*—Bardmesser Law Group

(57) ABSTRACT

A compensating accelerometer includes a housing, and a sensing element mounted in the housing. The sensing element includes a pendulum flexibly mounted on a base. The sensing element includes a coil mounted on a movable plate, a curtain having a slit, and a load mass affixed to the curtain. An angle sensor within the housing includes the curtain, a fork, a light source and a differential light detector. A momentum sensor within the housing includes a permanent magnet, an inner magnetic conductor, an outer magnetic conductor and the coil. The permanent magnet is magnetized in a direction of an axis of the pendulum. A stopper is used to adjust position of the fork. A spring is on opposite side of the fork, for taking up slack in the fork. A fixator has an eccentric, for adjusting a gap between the curtain and the light detector.

19 Claims, 9 Drawing Sheets

COMPENSATING ACCELEROMETER WITH OPTICAL ANGLE SENSING

CROSS-REFERENCE TO RELATED APPLICATIONS

This application is a non-provisional of U.S. Provisional Patent Application No. 60/783,448, filed on Mar. 20, 2006, entitled COMPENSATING ACCELEROMETER WITH OPTICAL ANGLE SENSING, which is incorporated by reference herein in its entirety.

BACKGROUND OF THE INVENTION

1. Field of the Invention

The present invention relates to measurement equipment, and more particularly to compensating pendulum-type linear accelerometers with flexible suspension of the sensing element.

2. Description of the Related Art

An example of a conventional accelerometer is illustrated in Japanese Patent No. 188924/1981. This accelerometer includes an inertial mass (in this case, a pendulum) that is placed in a sealed housing. Inside the sealed housing there is typically a vacuum or an inert gas, such as helium. The inertial mass is generally in the shape of a movable rod, whose lower portion is attached, using flexible suspension, to a plate. The plate is then affixed, using screws, to a base surface of one of the frames. The rod can rotate, using the flexible suspension, around the plate in the direction of the measurement axis of the accelerometer. The rod of the pendulum has two cylindrically shaped coils attached to it.

The axial magnetic systems of the accelerometer include magnetic conductors, in this case first and second frames, which are made of magnetically soft material. The magnetic axial systems also include permanent magnets and field concentrators, such that the movable coils are located in the gaps formed between the surfaces of the magnetic conductors and the field concentrators. The above elements together with the movable coils comprise the momentum sensor of the accelerometer.

Both frames are rigidly connected to each other, and each of the frames includes stoppers for limiting the range of motion of the pendulum. This range of motion can be regulated by moving the stoppers in the threaded openings in the frames.

Inside the housing there is an angle sensor that measures the movement of the pendulum. The angle sensor consists of a single light source and two light detectors. The pendulum is located between the frames, such that the light source is located on one side of the pendulum, and the light detectors are located on the other side of the pendulum. Thus, the pendulum acts as a shading element that blocks the light from the light source to the light detectors. When there is no measured acceleration along the measurement axis, the pendulum is in a neutral position, and some of the light from the light source is shielded by the pendulum, while the remainder of the light is evenly distributed between the two light detectors. Thus, the current produced by the light detectors (if, for example, photodiodes are used) is equal. Note that the surfaces of the photodiodes (light detectors) need not be entirely illuminated, but so long as the illumination of each detector is the same, the output currents are the same, indicating that the measured acceleration is zero.

When the sensor experiences acceleration along the measurement axis, the pendulum is displaced from its neutral position due to inertia force. As a result, the light distribution between the two detectors changes, and therefore the relationship between the current from the two detectors also changes. The difference between the two currents is related to the acceleration, and using conventional electronics, can be converted to an acceleration value. The current can also be used in a feedback circuit; it passes through the movable coils interacts with the magnetic field of the permanent magnets and returns the pendulum to its neutral position. The magnitude and polarity of the feedback current therefore permit a measurement of the acceleration.

The conventional accelerometer described above has a number of disadvantages. One of the disadvantages is that due to the relatively large dimensions of the rod of the pendulum, the light detectors need to be placed relatively far apart, which tends to increase noise and reduces the sensitivity of the measurement. Another disadvantage is that the neutral position of the pendulum typically does not precisely correspond to a zero output signal of the accelerometer. Yet another disadvantage is that mechanical tuning of the accelerometer tends to be difficult, particularly with regards to the zero bias signal.

Another example of a conventional accelerometer is described in U.S. Pat. No. 4,649,748. The accelerometer described in this patent shares some commonalities with the earlier-described accelerometer. However, the accelerometer in U.S. Pat. No. 4,649,748 has the following differences compared to the device of Japanese Patent No. 188924/1981: first, the first frame—the magnetic conductor of the magnetic system—is used as a mounting base of the accelerometer, which permits simplifying the manufacturing of the accelerometer, and also reduces its mass.

Additionally, the free end of the pendulum rod, which is located between the light source and the light detectors, is formed as a thin plate which permits the light source and the light detectors to be closer to each other. This increases the sensitivity of the angle sensor, and reduces the noise in its output. One of the options is for the thin plate to also have the shape of a rod, another option is to have the plate shaped as a thin rod with a slit along the axis of the rod, such that part of the light passes through the slit.

The various elements of the overall construction where the light source and light detectors are housed are pressed against the frames using a flat spring, which increases the precision of the mechanical tuning of the zero bias signal.

The device described in U.S. Pat. No. 4,649,748 has a number of disadvantages. For example, one of the disadvantages is due to the use of two magnetic systems. In case of a need to increase range of measured acceleration, this leads to a relatively values for currents that might flow through the coils, which in turn leads to a large amount of heat being dissipated, which in turn leads to an error source in the measurement, relating to the waste heat. Additionally, the use of two different magnetic systems increases the manufacturing cost and complexity of the device. These disadvantages are also present in the device described in Japanese Patent No. 188924/1981, discussed above.

Furthermore, the mechanical tuning of the zero bias signal is relatively coarse. Furthermore, a relatively small range of displacement of the light source and detectors relative to the housing makes it difficult to tune the angle sensor when there is a relatively large angle between the axis of the pendulum rod in the neutral position, and the base mounting surface of the accelerometer.

SUMMARY OF THE INVENTION

The present invention relates to compensating accelerometers that substantially obviates one or more disadvantages of the conventional accelerometers.

More particularly, in an exemplary embodiment of the present invention, a compensating accelerometer includes a housing, and a sensing element mounted in the housing. The sensing element includes a pendulum flexibly suspended on a base. The pendulum includes a coil mounted on a movable thin plate, a curtain having a slit, and a load mass affixed to the curtain. An angle sensor within the housing includes the curtain, a fork, a light source and a differential light detector. A momentum sensor within the housing includes a permanent magnet, an inner magnetic conductor, an outer magnetic conductor and the coil. The permanent magnet is magnetized in a direction of an axis of the pendulum. A stopper is used to adjust position of the fork. A spring is on opposite side of the fork, for taking up slack in the fork. A fixator has an eccentric, for adjusting a gap between the curtain and the light detector.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to embodiments of the present invention, examples of which are illustrated in the accompanying drawings.

Figure 1:
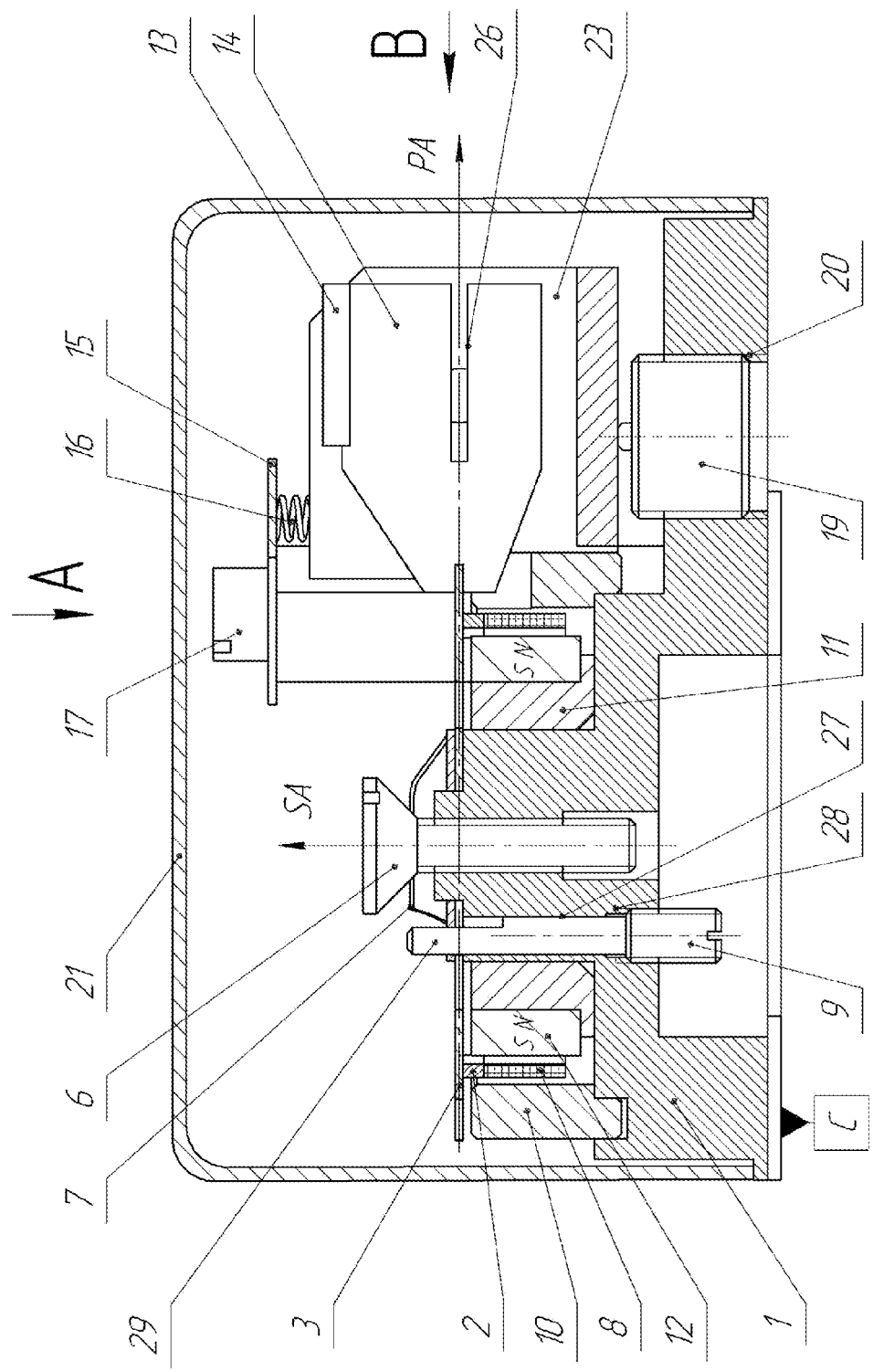
FIG. 1 illustrates a cross-sectional view of the accelerometer of one embodiment of the invention, with the view shown along the sensitivity axis SA and pendulum axis PA.
Figure 2:
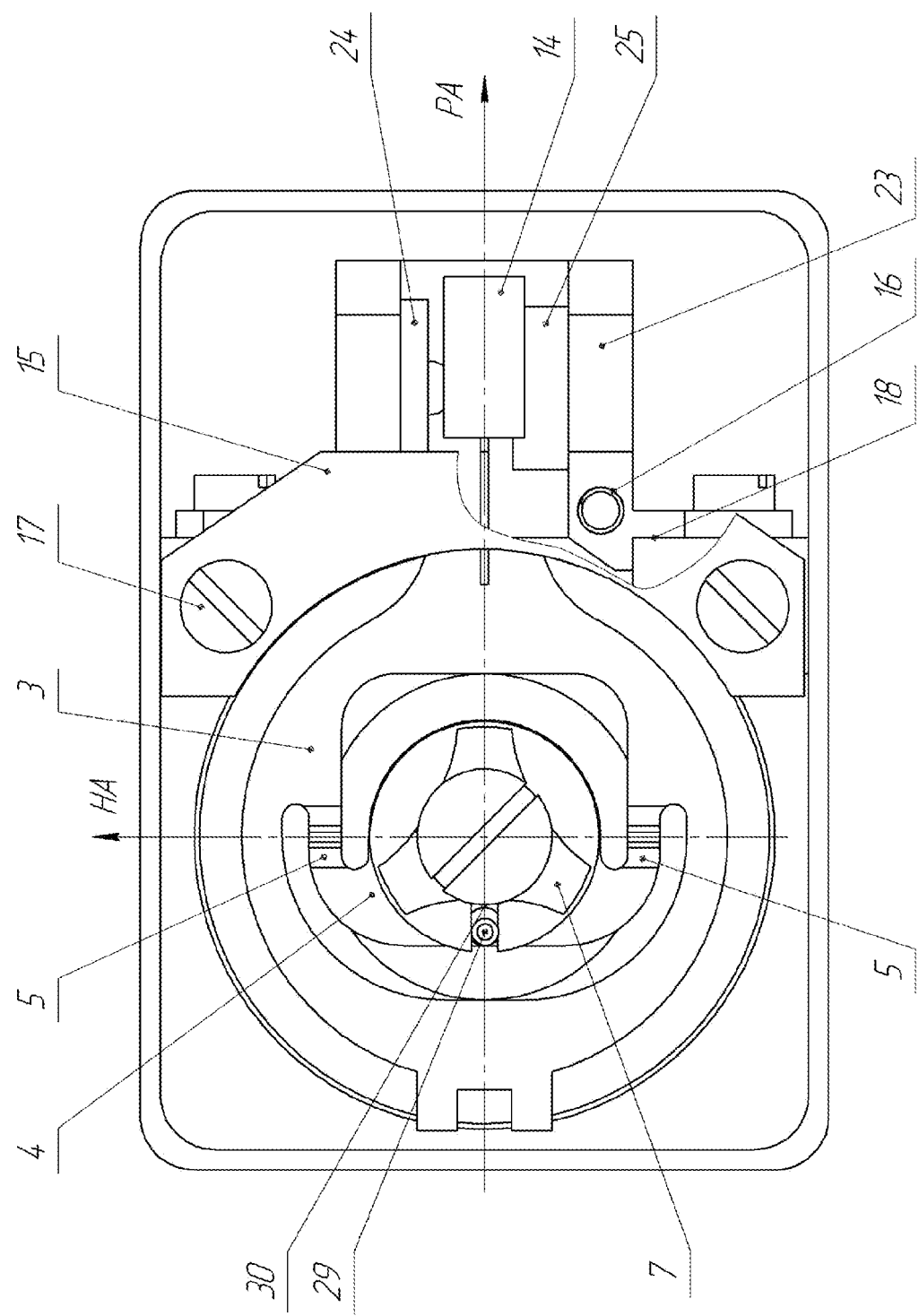
FIG. 2 shows the view in the direction of arrow A in FIG. 1, with element 21 removed.
Figure 3:
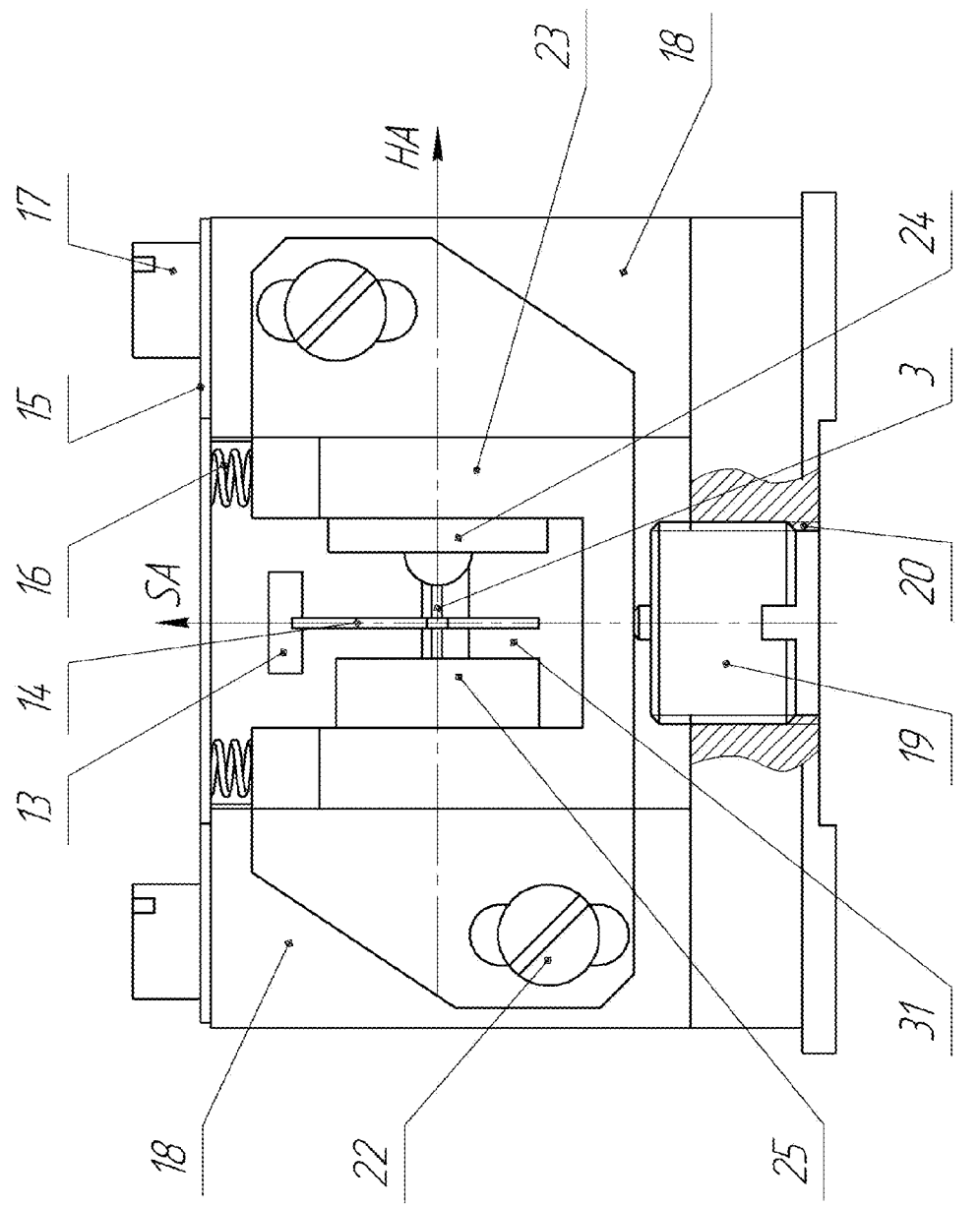
FIG. 3 shows the view in the direction of arrow B in FIG. 1, with element 21 removed.
Figure 4A:
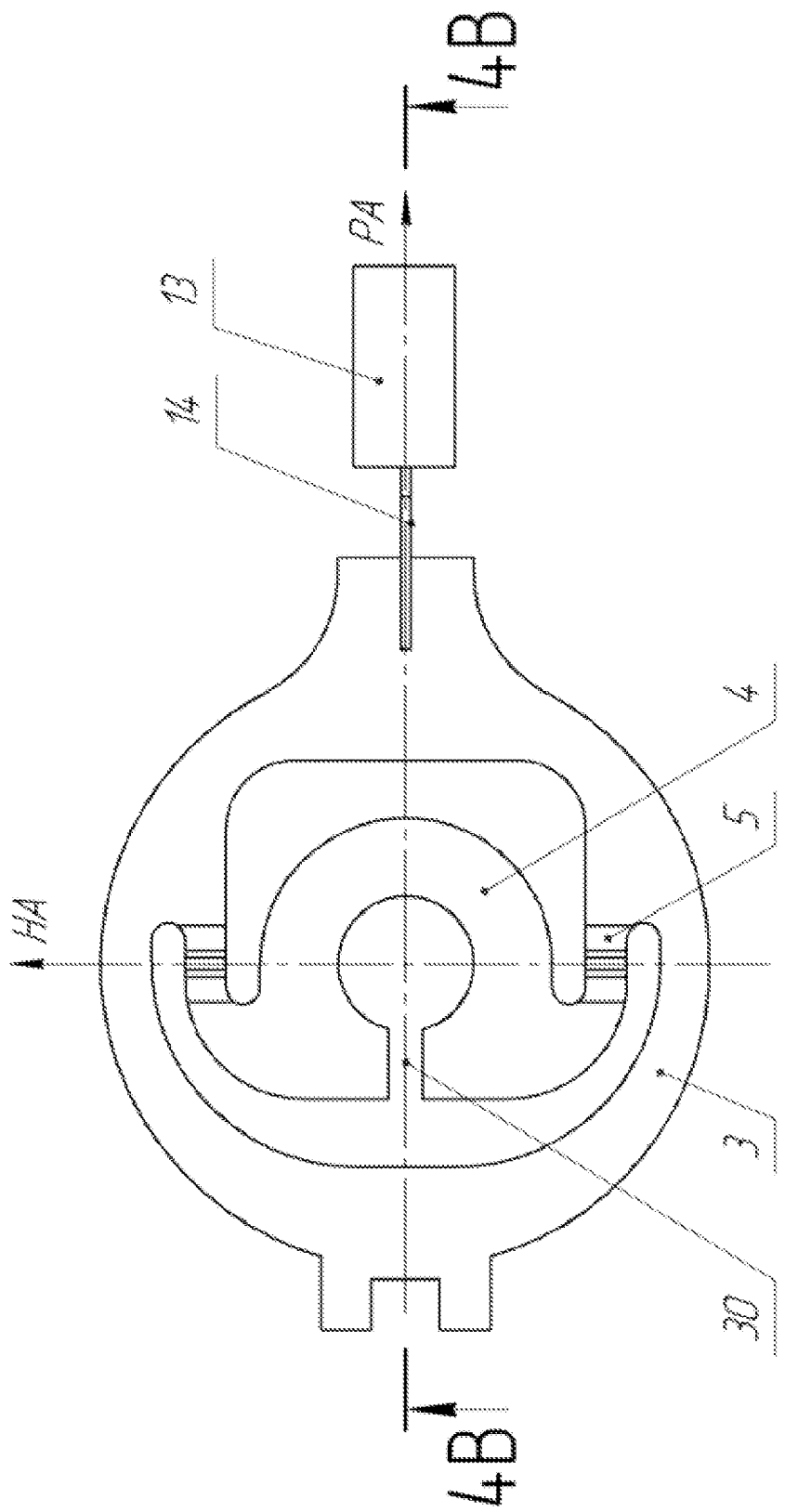
FIGS. 4A and 4B illustrate the sensing element.
Figure 4B:
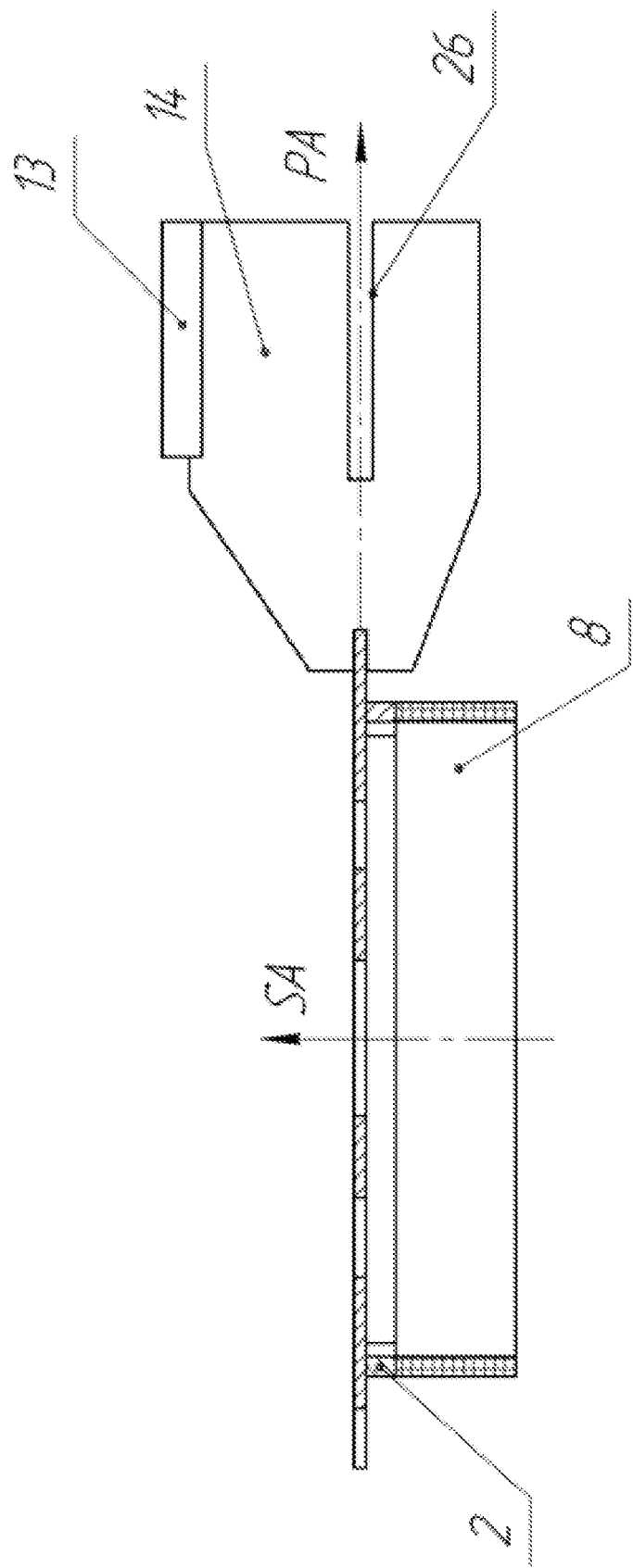

FIGS. 1-3, 4A and 4B illustrate an exemplary embodiment of the accelerometer of the present invention. FIG. 1 illustrates a cross-sectional view of the accelerometer of one embodiment of the invention, with the view shown along the sensitivity axis SA and pendulum axis PA. FIG. 2 shows the view in the direction of arrow A in FIG. 1, with element 21 removed. FIG. 3 shows the view in the direction of arrow B in FIG. 1, with element 21 removed. FIGS. 4A and 4B illustrate the sensing element.

The accelerometer includes a housing 1, with a sensing element located in its upper portion. The sensing element includes an inertial mass, formed by a movable plate 3, a coil 8 mounted on the plate 3, a curtain 14 that has a slit 26, with the slit oriented along the axis PA of the pendulum and a load mass 13, which is rigidly connected to the curtain 14. (As an option, the load mass 13 and the curtain 14 can be manufactured as a single element.) The sensing element also includes a fixed base 4 and a flexible suspension 5, used to attach the plate 3 to the base 4. Attachments 2 are used to connect the coil 8 to the plate 3. The base 4 is fixedly mounted to the upper portion of the housing 1, for example, using a screw 6 and a spring washer 7.

The housing 1 includes a differential optical angle sensor and a momentum sensor. The momentum sensor includes a magnetic system and the coil 8. The magnetic system is located in the upper cylindrical part of the housing 1, and includes an outer magnetic conductor 10, an inner magnetic conductor 11, and a ring-shaped magnet 12, which has a magnetization direction along the axis PA of the sensing element. The ring-shaped magnet 12 is typically a permanent magnet, although an electromagnet can also be used. The suspension axis HA of the sensing element is located in the neutral plane of the permanent magnet 12. The coil 8 is located in the gap between the inner surface of the outer magnetic conductor 10 and the outer surface of the permanent magnet 12.

The optical angle sensor includes a fork 23. A light source 24 (e.g., an LED) and a two-element photodetector 25 are mounted in the fork 23. The photodetector can be, for example, a photodiode. The curtain 14, with the slit 26, is mounted on the plate 3 of the sensing element. The lower portion of the housing 1 includes a threaded opening 20, in which a threaded stopper 19 can be placed. Also, the housing 1 includes an opening 27 with a thread 28 in its lower part. A fixator 9 that includes an eccentric 29 can be located in the opening 27. The fork 23, with the light source 24 and the photodetector 25 mounted on it, is arranged in the housing 1 in a manner that permits it to move up and down along guides 18, and to ultimately be affixed relatively to the housing 1 by using the screws 22.

The lower surface of the fork 23 contacts against the stopper 19. The upper surface of the fork 23 contacts against two springs 16, which abut against a flange 15. The flange 15 is fixed to the housing using screws 17. When the stopper 19 moves in the opening 20, the fork 23 moves along the axis SA along the guides 18. The springs 16 are used to take up any slack in the movement of the fork 23.

Figure 5:
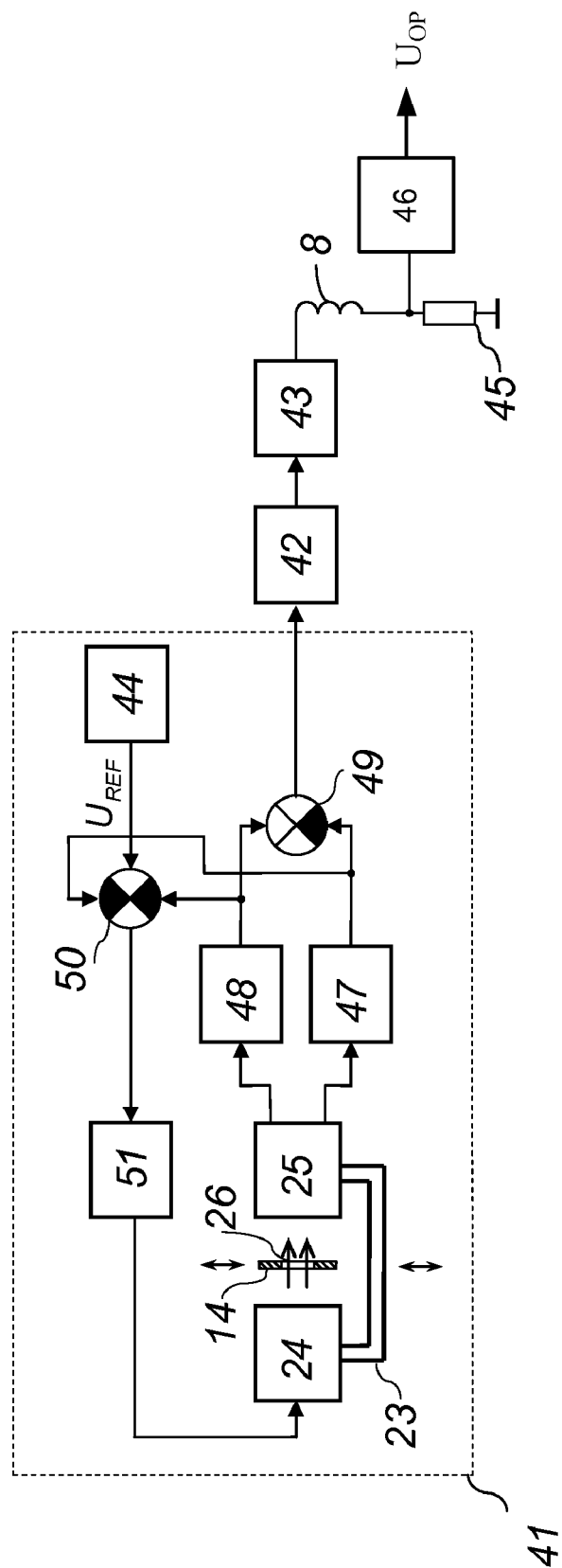
FIG. 5 illustrates a functional electrical circuit diagram of the accelerometer.

A casing 21 can be attached to the housing 1, to protect the accelerometer from external influences. The housing 1 also includes a base mounting surface C, which is perpendicular to the measurement axis SA. The functional electrical schematic of the accelerometer is show in FIG. 5. The accelerometer includes an optical angle sensor 41, a correcting element 42, an amplifier 43, coils 8, a resistor 45 and a filter 46, as shown in FIG. 5. $U_{OP}$ is the output voltage of the accelerometer. The angle sensor 41 includes a light emitting diode 24, a two-element photodiode 25, a curtain 14 with a slit 26, preamplifiers 47 and 48, summers 49 and 50, a current regulator 51, and a reference voltage source 44 that outputs a reference voltage $U_{REF}$, all connected as shown in FIG. 5.

The accelerometer works as follows: when no acceleration a is applied along the axis SA, the inertial mass of the sensing element is in a neutral position.

Therefore, the curtain 14 is also in a neutral position relative to the LED 24 and the dual element photodiode 25. In the neutral position, when the zero bias signal is being tuned mechanically, the illuminated areas of the two-element photodiode 25 are equal, and each is equal to half of the active area.

Each of the elements of the photodiode 25 generates an electric current, whose value is proportional to the area receiving light from the LED 24, as well as to the intensity of the light. In the neutral position, the areas receiving light and the intensities are all equal, therefore, the output voltages at the input of the preamplifiers 47 and 48 also equal, and proportional to the photo-induced currents. In the summer 49, these voltages are subtracted, which results in a zero output voltage, which also is the zero output of the angle sensor. When the acceleration a is applied along the axis SA, the inertial mass, due to the moment of inertia force $M_i$ is deflected, due to the flexible suspension 5, relative to the housing 1 of the accelerometer. If the acceleration a is positive, the inertial mass is displaced towards the surface C, and if it is negative, away from the surface C.

The curtain 14 also moves, together with the inertial mass, relative to the LED 24 and the photodiode 25. The movement of the curtain 14 results in one of the elements of the photodiodes having being exposed to more light, and the other one being exposed to less light. Therefore, the voltages at the outputs of the preamplifiers 47 and 48 also change, the output voltage at the output of the summer 49 becomes non-zero, and its value is proportional to the deflection of the inertial mass, while its sign corresponds to the direction of the deflection. Afterwards, the voltage passes through the correction element 42 and the amplifier 43, whose output, in the form of a negative feedback signal, is supplied to coil 8. The current $I_{OP}$ through the coil 8 interacts with the magnetic field of the permanent magnet 12, and creates a feedback moment $M_F$ around the suspension axis HA. This balances out the moment of inertia force $M_i$ of the measured acceleration, and returns the inertial mass to the neutral position. The current $I_{OP}$, which passes through the resistor 45, creates a voltage $U_{op}=I_{OP} R$, where R is the resistance of the resistor 45. This voltage, after passing through the filter 46, is the output signal of the accelerometer.

The eccentric 29 of the fixator 9 is located in the slit 30 of the base 4, and is intended for regulating the gap 31 between the curtain 14 and the photodiode 25, as shown in FIGS. 2 and 3. The size of the gap 31 therefore is related to the areas of the photodiode 25 which receive light from the LED 24. At a nominal value of the gap 31, in the neutral position of the inertial mass, the area irradiated by the light from the light source 24 should be equal to one half of the total area. Rotating the fixator 9, for example, using a screwdriver, leads to a rotation of the axis PA relative to the measurement axis SA. At the same time, there is a change in the gap 31 between the curtain 14 and the photodiode 25. Therefore, the gap 31 can be tuned until its value reaches the sought nominal value.

Mechanical tuning of the zero bias signal of the accelerometer is performed by moving the fork 23 along the guides 18, which moves the fork 23 along the axis SA. To mechanically tune the zero bias signal the accelerometer is arranged in such a manner that the inertial mass of the sensing element is located in the neutral position. The movement of the fork 23 is achieved by moving the stopper 19, which contacts the fork 23, along the thread 20. Together with a fork 23, the LED 24 and the photodiode 25 also move relative to the slit 26 of the curtain 14, which is positioned in the neutral position of the inertial mass of the accelerometer. Due to this movement, the polarity of the current $I_{OP}$ also changes, which means that the sign of the output at the summer 49, representing the output signal of the accelerometer, also changes.

The position of the fork 23 relative to the guides 18, when the output voltage of the summer 49 is zero, is the position when the mechanical tuning of the zero bias signal is performed. In this position, the fork 23 is fixed in place along the guides 18 by using the screws 22.

When the accelerometer is functioning, its temperature can change in a relatively broad range, which can lead to a change in the parameters of its various electronic and mechanical components, as shown in FIG. 5. To stabilize the transfer coefficient of the angle sensor when the temperature changes, an additional feedback circuit is used. The feedback circuit includes a summer 50, an LED current regulator 51, and a reference source 44. Using the summer 50, the sum of the voltages at the outputs of the preamplifiers 47 and 48 is compared with the reference voltage $U_{REF}$ from the reference voltage source 44.

When the transfer coefficient of the angle sensor is equal to a nominal value (i.e., the value calculated based on sensor characteristics and geometry), the voltage at the output of the summer 50 is equal to zero, and the regulator 51 maintains the current at the LED 24 unchanged. For example, when the transfer coefficient of the angle sensor 41 increases, the voltage at the outputs of the preamplifiers 47 and 48 also increases, the voltage at the output of the summer 50 becomes negative, which leads to a reduction in the current through the LED 24, and therefore a reduction in the light detected by the two elements of the photodiode 25. Therefore, the transfer coefficient of the angle sensor 41 reduces to its nominal value. Thus, the transfer coefficient of the angle sensor is stabilized, and the temperature-caused variation in the output of the accelerometer is reduced.

Figure 6A:
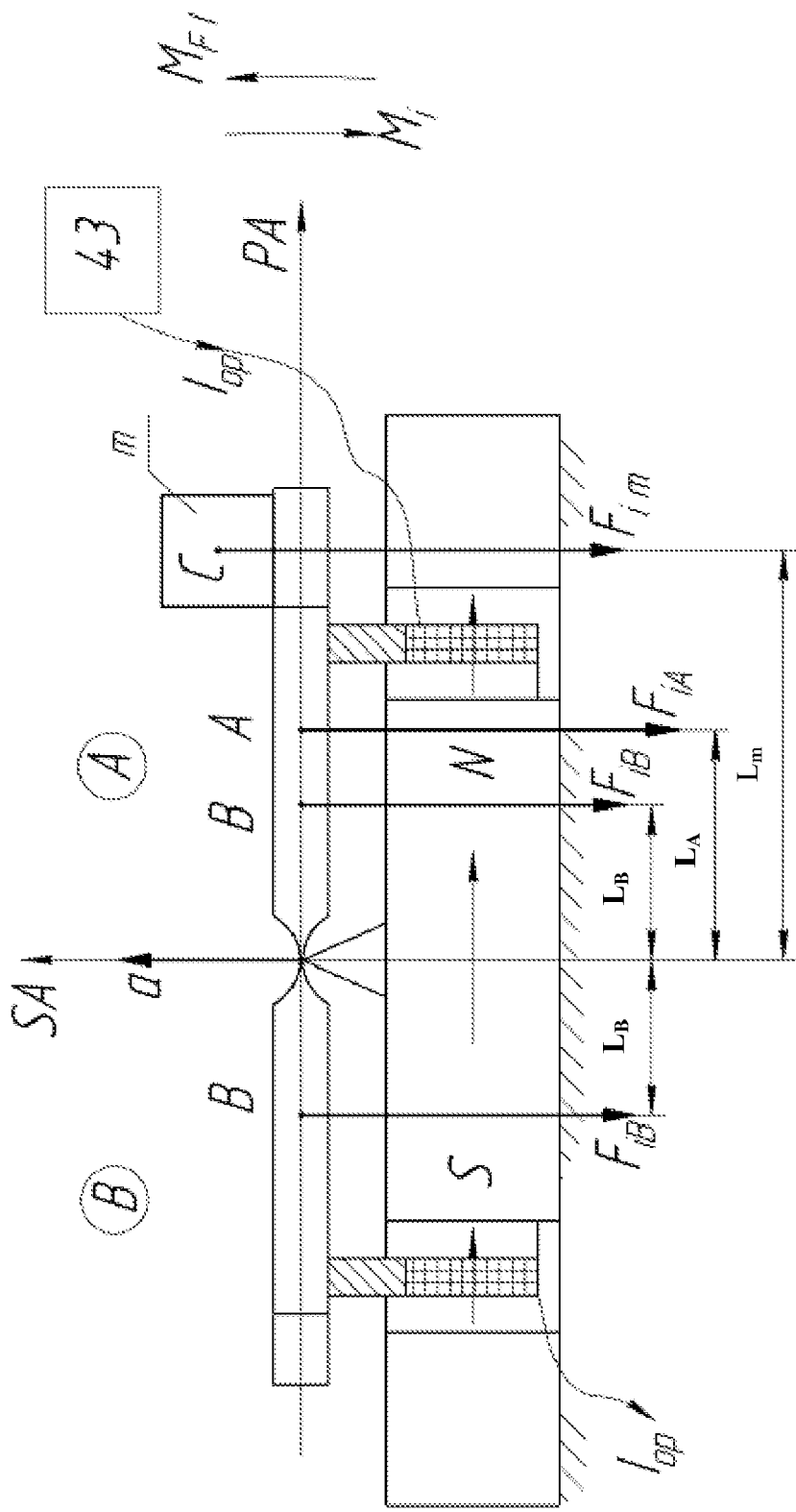
FIGS. 6A and 6B illustrate the principle of operation of the sensing element of the exemplary accelerometer of FIG. 1.
Figure 6B:
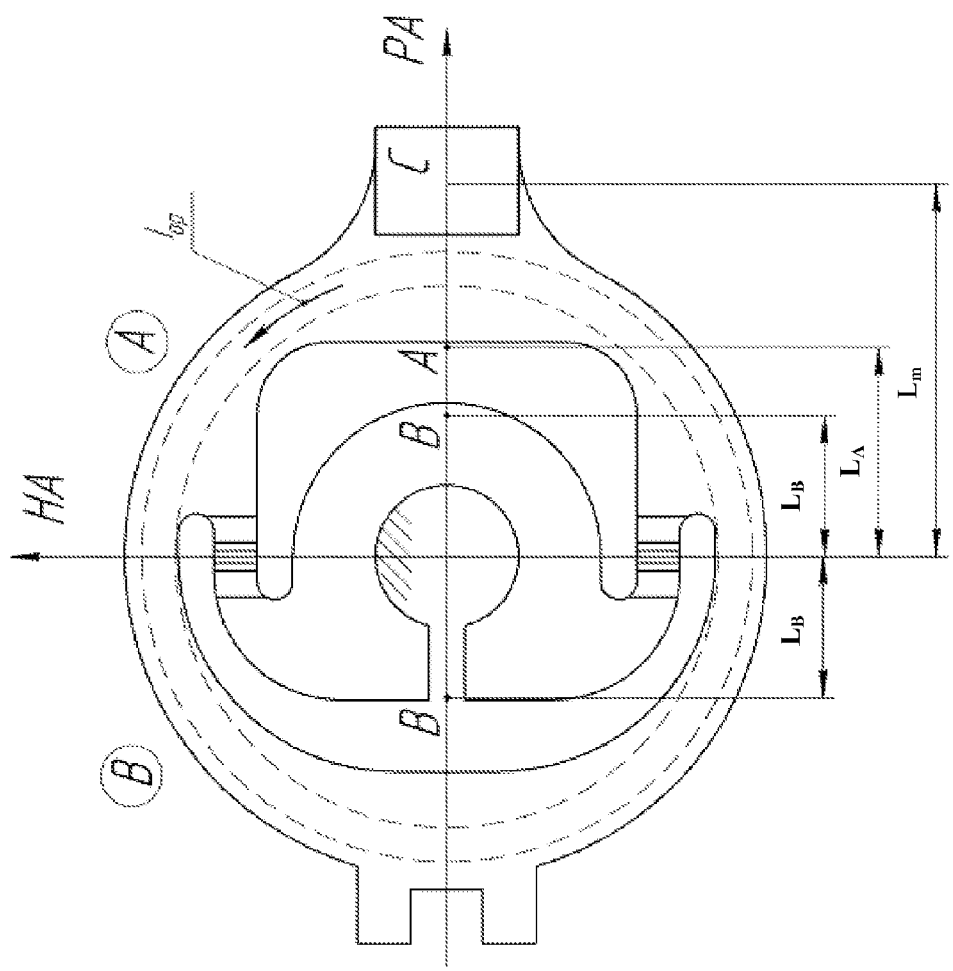
Figure 7:
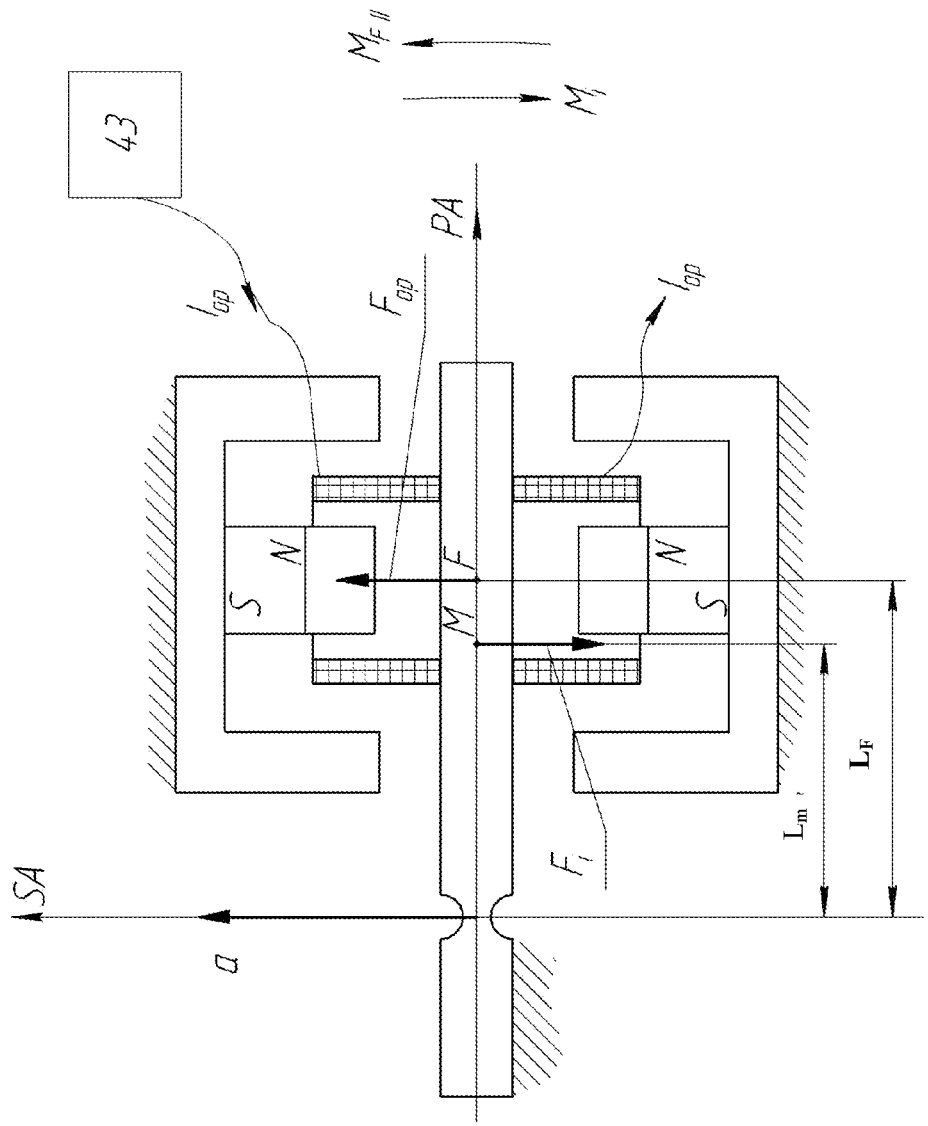
FIG. 7 illustrates the differences between the described accelerometer and conventional accelerometers.

FIGS. 6 and 7 explain the differences between the accelerometer described herein and conventional accelerometers. For the accelerometer described herein, with the variables: an inertial mass $m_\Sigma$, a momentum $M_i$ due to the inertia force $F_i$, feedback momentum $M_F$ and a feedback current $I_{OP}$. Here, the index "I" refers to the accelerometer of the present invention, and the index "II" refers to the conventional accelerometer.

$$m_{\Sigma I} = m_A + m_B = 2m_B + m, \tag{1}$$

$$\begin{aligned} M_{iI} &= F_{iA}L_A - F_{iB}L_B \\ &= (F_{iB}L_B + F_{im}L_m) - F_{iB}L_B \\ &= (m_B L_B + m L_m - m_B L_B)a \\ &= m L_m a, \end{aligned} \tag{2}$$

$$M_{FI} = \frac{2}{\pi} B r_K L_W I_{OPI}, \tag{3}$$

$$I_{OPI} = \frac{\pi m L_m}{2 B r_K L_W} a, \tag{4}$$

where $m_B$, $L_B$—mass and center of mass coordinate of the left portion ("B") (relative to the axis HA) of the sensing element (i.e., half of the plate 3, and half of the coil 8); $m_A$, $L_A$—mass and center of mass coordinate of the right portion (circled "A") (relative to the axis HA) of the sensing element, whose mass consists of the mass $m_B$ and the mass of the load 13, together with the curtain 14; $F_{iB}$, $F_{iA}$—inertia forces of the acceleration of the portions "A" and "B" of the inertial mass; $F_{im}$—inertia force of the load mass 13 and the curtain 14; $L_m$—center mass coordinate of the load mass 13 with the curtain 14; B is the induction in the working gap of the magnetic system of the momentum sensor; $r_K$—radial dimension of the coil 8, $L_W$ is the length of the wire of the coil 8.

The product $mL_m$ is called the pendulum value of the accelerometer. When current $I_{OP\,I}$ flows through the coil 8, the amount of power $P_I$ is the waste heat generated in the coil 8, defined by the expression $$P_I = I_{OPI}^2 R_K = I_{OPI}^2 \rho \frac{L_W}{S} \tag{5}$$

where $R_K$—resistance of the coil 8; $\rho$, $L_W$, $S$—wire resistivity, wire length and wire cross-section of the coil 8, respectively.

For the conventional accelerometers described above, the parameters below are designated by the index "II," and are defined by the geometry and construction of those accelerometers as follows:

$$m_{\Sigma II} = m_{1II} + m_{2II} \approx m_{2II}, \tag{6}$$

$$m_{2II} = \gamma L_W S, \tag{7}$$

$$M_{iII} = m_{\Sigma II} L_m a \approx m_{2II} L_m a, \tag{8}$$

$$M_{FII} = B L_W L_F I_{opII}, \tag{9}$$

$$I_{opII} = \frac{m_{\Sigma II} L_m}{B L_W L_F} a \approx \frac{\gamma S L_m}{B L_F} a, \tag{10}$$

where $m_{1\,II}$—mass of the rod of the inertial mass; $m_{2\,II}$—mass of both coils mounted on the rod of the inertial mass. In this design of the sensing element, in order to increase the maximum acceleration that can be measured, it is desirable to have the mass of the rod of the proof mass $m_{1\,II}$ to be substantially less than the mass $m_{2\,II}$ of the coils, therefore, in equation 6, it is assumed that the mass of the entire inertial mass is substantially defined by the mass of the coils; $\gamma$, $L_W$, S—wire density, total wire length and wire cross section of the coils, respectively; $L_m$—distance to the inertial mass center; $L_F$—distance to the point of application of the restoring force, created by the momentum sensor (which coincides with the axis of symmetry of the coils); B—magnetic induction in the working gap of the magnetic systems of the momentum sensor.

The product $m_{\Sigma\,II}L_m \approx m_{2\,II}L_m$ is called the pendulum value of the conventional accelerometers. Similar to the equations described above, the feedback current $I_{OP\,II}$ also generates waste heat, designated by $P_{II}$, which is given by $$P_{II} = I_{opII}^2 R_K = I_{opII}^2 \rho \frac{L_W}{S}, \tag{11}$$

where $R_K$ is the total resistance of the coils of the momentum sensor, connected in series; $\rho$, $L_W$, S are resistivity, length and cross section of the wire of the coils, respectively.

Based on equations 1-11, we can compare the conventional accelerometer and the accelerometer described herein. For purposes of comparison, it can be taken that all the accelerometers have the same maximum acceleration $a_{max}$ that they can measure, the same pendulum value $$mL_m = \gamma L_w S L_m, \tag{12}$$

which would be the case if they had the same distance from the axis HA to their center masses $L_m$ and the same wire length $L_W$ of the wires in the coil 8 and in two coils in the conventional accelerometer. Then, when the following condition is true $$\pi L_F = 2 r_K, \tag{13}$$

the values of the maximum feedback current occurs at the maximum acceleration $I_{OP}(a_{max})$, which flows in the coils and will be equal, as well as the amount of waste heat dissipated due to the current. Therefore, the maximum temperature overheating of magnetic systems is due to the feedback current $I_{OP}$ approximately equal and leads to approximately equal multiplicative error of accelerometer (depending on the measured acceleration a).

Consider the situation where it is necessary to increase the maximum acceleration $a_{max}$ that the accelerometer needs to measure, by a factor of n, without increasing the pendulum value of the accelerometer (since reducing the pendulum value leads to a decrease in sensitivity of the accelerometer and a greater error in the measurement).

In the conventional accelerometer, based on equation 10, the current $I_{OP\,II}(a_{max})$, flowing through the coils, will increase by a factor of n as well, which means that, based on equation 11, the dissipated waste heat $P_{II}(a_{max})$ in the momentum sensor will increase by a factor of $n^2$. Therefore, the temperature of the permanent magnets will also increase as the square of the current increase. However, for the conventional accelerometer, the current $I_{OP\,II}(a_{max})$ is limited by the cross-section S of the wires of the coils of the momentum sensor.

In the proposed accelerometer, when $a_{max}$ increases by a factor of n, the length of wire in the coil 8 can increase by a factor of n, without changing the pendulum value of the accelerometer, since the coil 8 is mounted symmetrically on the plate 3 relative to the axis HA. Increasing the length of the wire in the coil 8 does not lead to a change in pendulum value—the pendulum value is determined only the load mass 13 and the curtain 14.

When the length of the wire in coil 8 increases by a factor of n, based on equations 3 and 4, the maximum compensating moment $M_{F\,I}$ will also increase by n, balancing out the maximum inertial moment $M_{i\,I}(a_{max})$ without an increase in the feedback current $I_{OP\,I}(a_{max})$ that flows in the coil 8. This means that, based on equation 5, the maximum waste heat dissipation $P_I(a_{max})$ increases only by a factor of n, not $n^2$. Therefore, the overheating of the permanent magnet will also increase only by a factor of n, not $n^2$, and the errors in the measurement have a linear dependence on $a_{max}$, rather than a non-linear dependence.

For the proposed accelerometer, there is no theoretical limit on $a_{max}$, since, based on equation 4, even when $a_{max}$ increases very significantly, the length of the wire in the coil 8 can be increased very significantly as well, so that $I_{OP\,I}(a_{max})$ will not be greater than the maximum allowed based on the cross-section S. Thus, the proposed accelerometer has a significant advantage in applications that require a large $a_{max}$.

Having thus described an embodiment of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A compensating accelerometer comprising:
a housing;
a pendulum within the housing flexibly coupled to a base, wherein the pendulum includes a coil mounted on a movable plate and a curtain having an opening;
a light source and a differential light detector both mounted on a fork and generating a signal proportional to angular displacement of the pendulum;
a magnet magnetized in a direction of an axis of the pendulum;
a magnetic conductor that, together with the coil and the magnet, is used to return the pendulum to a neutral position;
a feedback circuit generating an output proportional to acceleration experienced by the compensating accelerometer based on the angular displacement of the pendulum.

2. The accelerometer of claim 1, wherein the fork, the curtain, the light source and the differential light detector form an angle sensor of angular displacement of the pendulum.

3. The accelerometer of claim 2, further comprising a stopper that adjusts position of the fork.

4. The accelerometer of claim 3, further comprising springs in contact with the fork, for taking up slack in the fork.

5. The accelerometer of claim 3, further comprising a fixator that has an eccentric, for adjusting a gap between the curtain and the light detector.

6. The accelerometer of claim 2, wherein the fork is movable along a measurement axis of the accelerometer using guides, and is fixed in place using screws.

7. The accelerometer of claim 6, further comprising a stopper whose position can be adjusted in a threaded opening and which contacts the fork for fixing the fork in place.

8. The accelerometer of claim 7, further comprising a spring for taking up slack in a position of the fork, the spring positioned between the fork and a flange.

9. The accelerometer of claim 7, wherein a zero bias of the accelerometer is tuned mechanically by adjusting the stopper's position.

10. The accelerometer of claim 1, wherein the magnet is a permanent magnet.

11. The accelerometer of claim 1, wherein the opening is shaped as a slit.

12. The accelerometer of claim 1, wherein the movable plate has a thin portion to enable deflection of the plate.

13. The accelerometer of claim 1, wherein the magnetic conductor includes an inner magnetic conductor and an outer magnetic conductor.

14. The accelerometer of claim 1, wherein a differential light detector and a light source are fixed relative to the housing.

15. The accelerometer of claim 1, wherein the magnet, the magnetic conductor and the coil form a momentum sensor.

16. The accelerometer of claim 1, wherein an axis of suspension of the pendulum substantially coincides with a neutral plane of the magnet.

17. A compensating accelerometer comprising:
a housing;
a pendulum within the housing flexibly coupled to a base, wherein the pendulum includes a coil mounted on a movable plate and a curtain having an opening;
a light source and a differential light detector generating a signal proportional to angular displacement of the pendulum;
a magnet magnetized in a direction of an axis of the pendulum;
a magnetic conductor that, together with the coil and the magnet, is used to return the pendulum to a neutral position;
a feedback circuit generating an output proportional to acceleration experienced by the compensating accelerometer based on the angular displacement of the pendulum; and
a load mass affixed to the curtain.

18. A compensating accelerometer comprising:
a housing;
a pendulum within the housing flexibly coupled to a base, wherein the pendulum includes a coil mounted on a movable plate and a curtain having an opening;
a light source and a differential light detector generating a signal proportional to angular displacement of the pendulum;
a magnet magnetized in a direction of an axis of the pendulum;
a magnetic conductor that, together with the coil and the magnet, is used to return the pendulum to a neutral position;
a feedback circuit generating an output proportional to acceleration experienced by the compensating accelerometer based on the angular displacement of the pendulum; and
a second feedback circuit that compensates for temperature effects that distort the output.

19. A compensating accelerometer comprising:
a housing;
a pendulum within the housing flexibly coupled to a base and including a movable coil, the movable coil being symmetrical about a suspension axis of the pendulum;
a light source;
a differential photodiode serving as current source and generating a signal proportional to angular displacement of the pendulum, the signal based on light received from the light source;
a magnet magnetized in a direction of an axis of the pendulum;
a magnetic conductor that, together with the coil and the magnet, is used to return the pendulum to a neutral position;
means for mechanical tuning of a zero bias of the accelerometer; and
a circuit generating an output proportional to acceleration experienced by the compensating accelerometer based on the angular displacement of the pendulum.

* * * * *